(12) United States Patent
Olofsson et al.

(10) Patent No.: US 10,075,253 B2
(45) Date of Patent: Sep. 11, 2018

(54) METHODS AND NODES FOR HANDLING DELAY INFORMATION IN SYNCHRONISATION PACKETS

(71) Applicant: TELEFONAKTIEBOLAGET L M ERICSSON (PUBL), Stockholm (SE)

(72) Inventors: Mikael Olofsson, Skärholmen (SE); Stefano Ruffini, Rome (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 150 days.

(21) Appl. No.: 14/905,688

(22) PCT Filed: Feb. 20, 2015

(86) PCT No.: PCT/SE2015/050201
§ 371 (c)(1),
(2) Date: Jan. 15, 2016

(87) PCT Pub. No.: WO2016/133442
PCT Pub. Date: Aug. 25, 2016

(65) Prior Publication Data
US 2016/0373199 A1 Dec. 22, 2016

(51) Int. Cl.
*H04J 3/08* (2006.01)
*H04J 3/06* (2006.01)
(Continued)

(52) U.S. Cl.
CPC ........ *H04J 3/0673* (2013.01); *H04L 43/0858* (2013.01); *H04L 43/10* (2013.01); *H04L 47/28* (2013.01); *H04L 47/283* (2013.01)

(58) Field of Classification Search
CPC . H04L 43/0852; H04L 47/283; H04L 7/0037; H04L 43/0858; H04L 7/0008;
(Continued)

(56) References Cited

U.S. PATENT DOCUMENTS

2007/0147435 A1* 6/2007 Hamilton .................. G06F 1/14
370/503
2012/0026869 A1* 2/2012 Wang .................. H04L 41/5003
370/230
(Continued)

OTHER PUBLICATIONS

Eidson, et al., Spider transparent clock, IEEE International Symposium on Precision Clock Synchronization for Measurement, Control and Communication, Ann Arbor, Michigan, USA, Sep. 22-26, 2008.

*Primary Examiner* — Sai Aung
(74) *Attorney, Agent, or Firm* — NDWE LLP (57) ABSTRACT

Method and arrangement for providing delay information to synchronization packets passing a transport network node. In a transport network node synchronization packets propagate from a synchronization master node towards boundary clock nodes. The synchronization packets pass the transport network node, in which the synchronization packets are received, and a level of delay is determined. Furthermore, when the level of delay for the synchronization packets is above a threshold, the synchronization packets are marked with a delay indication. The received synchronization packets are sent to the boundary clock node or ordinary clock node, whether or not they are marked. By implementing functionality for determining a level of delay of synchronization packets, and marking passing synchronization packets with delay indications, boundary clock nodes and ordinary clock nodes may differentiate the received synchronization packets based on the delay identifications. Thereby, improved accuracy may be achieved when calculating time synchronization offsets.

12 Claims, 8 Drawing Sheets

(51) Int. Cl.
*H04L 12/841* (2013.01)
*H04L 12/26* (2006.01)

(58) Field of Classification Search
CPC ... H04L 43/106; H04L 43/0864; H04L 43/16; H04L 7/0041
See application file for complete search history.

(56) References Cited

U.S. PATENT DOCUMENTS

| | | |
|---|---|---|
| 2013/0077509 A1 | 3/2013 | Hirota |
| 2013/0080817 A1* | 3/2013 | Mihelic ............... G06F 1/12 713/401 |
| 2013/0246551 A1* | 9/2013 | Park ............... H04J 3/0667 709/208 |
| 2016/0211936 A1* | 7/2016 | Bottari ............. H04J 3/0641 |

* cited by examiner

Fig. 1 (existing art)

Fig. 2 (Existing art)

METHODS AND NODES FOR HANDLING DELAY INFORMATION IN SYNCHRONISATION PACKETS

TECHNICAL FIELD

This description relates generally to time or phase synchronisation in communication networks. Particularly, it relates to provisioning of delay information in packet switched networks.

BACKGROUND

In communication networks which applies LTE (Long Term Evolution) based radio access technologies, accurate time and phase alignment of the internal clock is important. Time and phase synchronisation is required for LTE-TDD (Time Division Duplex) many LTE-FDD (Frequency Division Duplex) coordination features e.g. for joint transmission, a wireless communication device receives data from multiple cells or multiple RBSs (Radio Base Stations), which offers better performance, but puts harder requirements on synchronisation. In packet synchronisation networks, a major problem for synchronisation protocols is the variance in the send time, access time, propagation time, and the receive time.

From the infrastructure perspective, mobile operators have a broad range of topologies to support. The physical network using different technologies such as microwave, fibre and copper wire will enable/limit different capabilities and characteristics. These differences in physical transport and in the different types of topologies, creates delay and delay variation that is unpredictable.

One solution for synchronising internal clocks in communication network is to distribute PTP (Precision Time Protocol) messages from a Grandmaster entity, which in generally is located centralised in the communication network, to PTP-clients at each cell site. The PTP protocol distributes PTP messages from a Grandmaster entity to transport network nodes and access network nodes who update their internal clocks based on the received time information in order to stay synchronised. A PTP system is a distributed, networked system consisting of a combination of PTP and non-PTP devices. PTP systems include a grandmaster entity, boundary clock nodes, ordinary clock nodes, and transparent clock nodes. The grandmaster entity is a form of synchronisation master node. Often the Grandmaster entity is located in a centralized part of the network; causing PTP messages to travel multiple hops. A "boundary clock" has multiple network connections and can accurately bridge synchronisation from one network segment to another. A synchronisation master is selected for each of the network segments in the system. The root timing reference is called the Grandmaster clock. The Grandmaster entity transmits synchronisation information to the clocks that are in its network segment. The boundary clocks with a presence on that segment then relay accurate time to the other segments to which they are equally connected. The transparent clock modifies PTP messages by including appropriate timestamps as they pass through the device. The Timestamps in the PTP messages are compensated for time spent traversing the network and equipment e.g. (switch/router).

Figure 1:
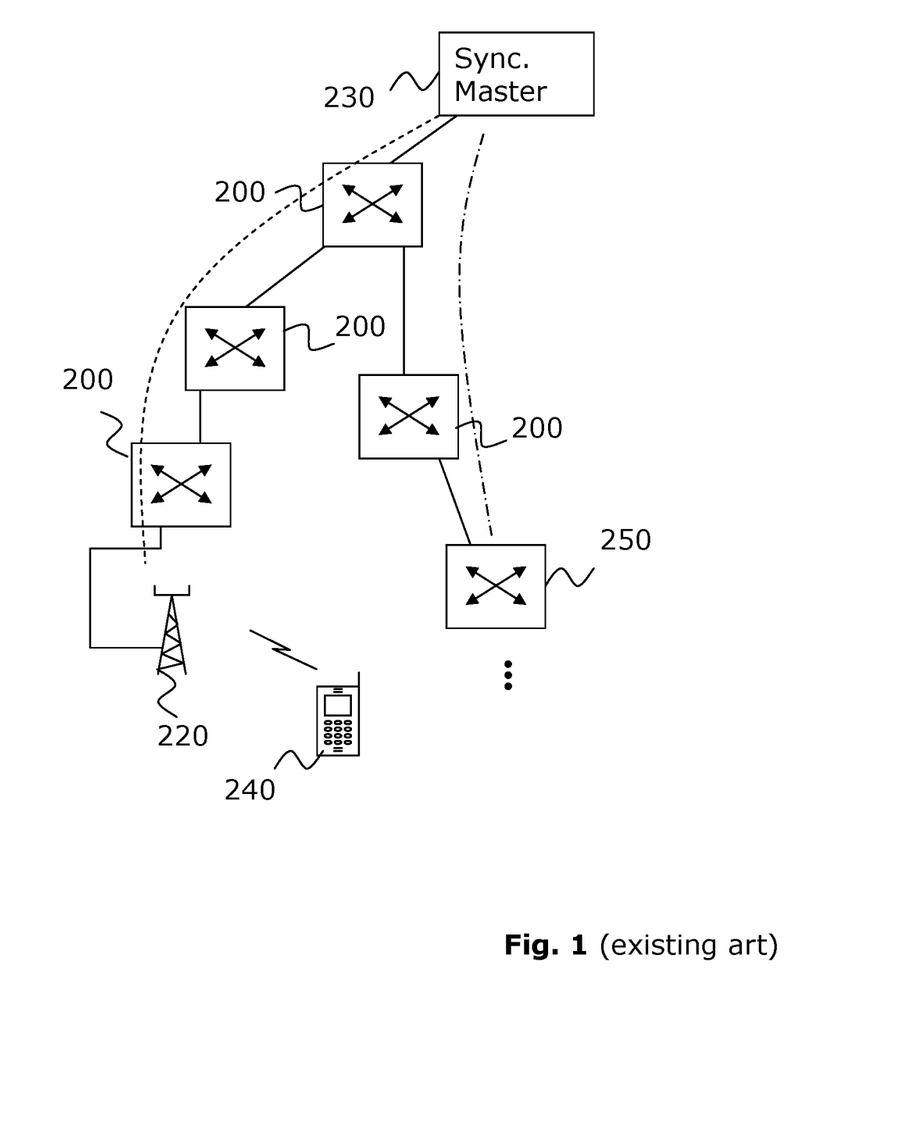
FIG. 1 is a schematic illustration of a situation in accordance with the existing art.

With reference to FIG. 1, which is a schematic overview, a scenario of a communication network will now be described according to one example.

The communication network comprises a transport network with a plurality of transport network nodes 200, e.g. suitable switches, routers or gateways. In the FIG. 1, is further illustrated, a synchronisation master node 230, a radio base station 220 of a suitable radio access technology, and a boundary clock node 250. Within this disclosure, as well synchronisation master nodes 230, radio base stations 220 (which typically utilises an ordinary clock) and boundary clock nodes 250 will be referred to as transport network nodes too. In the figure a mobile telephone 240 is illustrated which communicates via an access network with the radio base station 220, in accordance with any suitable radio access technology, e.g. LTE (Long Term Evolution), LTE-Evolution, 5G (of 3GPP (Third Generation Partnership Program)), UMTS (Universal Mobile Technology System), or HSPA (High Speed Packet Access).

The synchronisation master node 230 produces a timing reference which is delivered by synchronisation packets to the ordinary clock nodes 220 or boundary clock nodes 250 along respective paths (marked with dashed lines and dash-dotted lines respectively).

Figure 2:
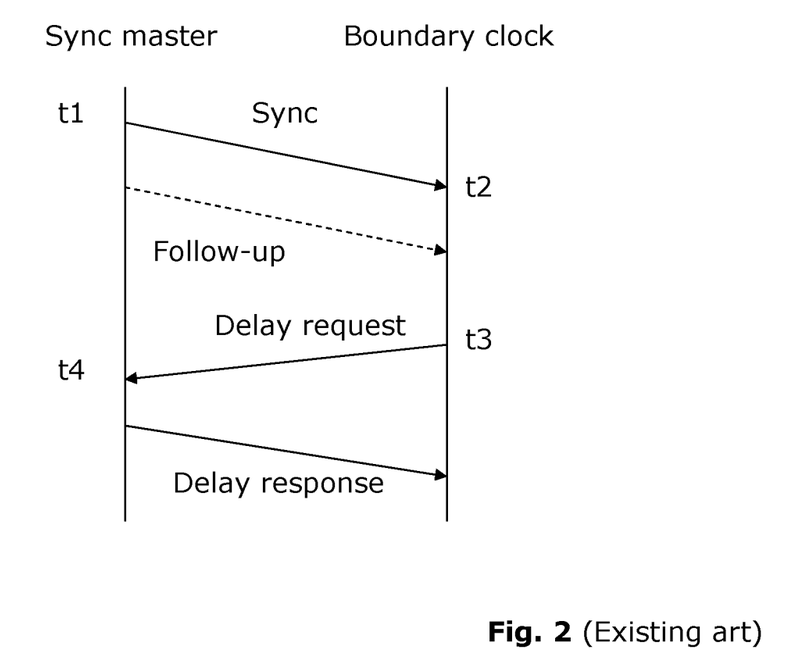
FIG. 2 is schematic signalling chart in accordance with the existing art.

With reference to FIG. 2, which is a schematic signalling diagram, a scenario related to synchronisation will now be described according to one example.

The synchronisation master node sends a PTP packet which comprises a SYNC message and a time t1 towards a boundary clock node or an ordinary clock node possibly along a path of transparent clock nodes. The PTP packet arrives at the boundary clock node at a time t2. The time t2 depends on the propagation time along the path but also on various delays caused by the transport network nodes (e.g. buffering and queues). In response to the received SYNC message the boundary clock node sends a DELAY_REQ message in a PTP packet towards the synchronisation master node at the time t3. Also this PTP packet is delayed and arrives to the synchronisation master node at the time t4. The time t4 is then sent together with a sequence identifier with a DELAY_RESP message in a PTP packet to the boundary clock node or ordinary clock node. Based on the times t1, t2, t3 and the arrival t4 the boundary clock node or the ordinary clock node estimates a time offset towards the synchronisation master node as $((t2-t1)+(t4-t3))/2$.

It is desired to enable network operators to make better use of installed communication resources, e.g. in order to serve end-users more appropriately.

SUMMARY

It would be desirable to obtain improved performance for services in communication networks. It is an object of this disclosure to address at least any of the issues outlined above.

Further, it is an object to provide a synchronisation module of a network node with functionality for detecting a level of delay to be utilised for calculation of time synchronisation offset within the communication network. These objects may be met by a method and an arrangement according to the attached independent claims.

According to one aspect, a method is provided which is performed by a synchronisation report module of a first transport network node for providing delay information to synchronisation packets passing the first transport network node. The method comprises: receiving a first synchronisation packet originating from a second transport network node, and determining a level of delay for the first synchronisation packet caused by the first transport network node. Furthermore, the method comprises marking the first synchronisation packet with a delay indication, when the level of delay for the first synchronisation packet is above a first threshold. The method comprise also sending the first synchronisation packet towards a third transport network node.

Furthermore, the method may comprise: receiving a second synchronisation packet originating from the third transport network node, and determining a level of delay for the second synchronisation packet caused by the first transport network node. Moreover, the method may comprise marking the second synchronisation packet with a delay indication when the level of delay for the second synchronisation packet is above a second threshold, sending the second synchronisation packet towards the second transport network node. The delay indications may be implemented as flags, values, etc. of the synchronisation packets, e.g. provided within headers of the synchronisation packets. The level of delay may be determined by retrieving buffer statuses of queue-lengths of the first transport network node.

According to second aspect, a method is provided which is performed by an offset calculation module of a first transport network node for enabling the first transport network node to calculate a time synchronisation offset value between a second transport network node and the first transport network node. The method comprises: receiving a synchronisation packet from an intermediate transport network node, and determining a delay indication of the received synchronisation packet. The delay indication indicates a delay of at least one of: the synchronisation packet; or a related synchronisation packet, wherein the delay is caused by the intermediate transport network node. Thereby, the first transport network module will be enabled to calculate the time synchronisation offset value based the synchronisation packets which not comprise any delay indication.

According to further aspects, a synchronisation report module and an offset calculation module, which are adapted to perform the method steps of any of the above described respective methods, are also provided. Both the synchronisation report module and the offset calculation module comprise a controller and a communication module arranged to perform actions of the respective methods. Furthermore, according to yet another aspect, a network node which comprises any of the synchronisation report module or the offset calculation modules is also provided.

By implementing functionality for determining a level of delay of synchronisation packets in intermediate transport network nodes, and mark passing synchronisation packets with delay indications, boundary clock nodes and ordinary clock nodes may differentiate the received synchronisation packets based on the delay identifications. Thereby, improved accuracy may be achieved when calculating time synchronisation offsets. In particular the disclosed solution may allow distribution of timing protocols also over network nodes which not fully support transparent clock or boundary clock functions.

BRIEF DESCRIPTION OF DRAWINGS

The solution will now be described in more detail by means of exemplary embodiments and with reference to the accompanying drawings, in which.

DETAILED DESCRIPTION

There is a need for a solution which reduces time synchronisation offset inaccuracy for boundary clock nodes or ordinary clock nodes in communication networks, without requiring complex and expensive upgrading of already deployed transport networks.

Functionality is implemented in a synchronisation report module of a network node for determining whether the network node affects passing synchronisation packets with delays due to internal delays caused by the transport network node. Synchronisation packets which are determined to be critically delayed are marked with a delay indication, which enables a boundary clock nodes or ordinary clock nodes to omit these delayed synchronisation packets when determining an appropriate time synchronisation offset of the unmarked synchronisation packets. Thereby an improved awareness of the current time synchronisation offset of the boundary clock nodes or ordinary clock nodes could be acquired.

The term "Synchronisation packets" will be used in this disclosure to denote packets related to synchronisation offset or time delays within transport networks. Typically, the synchronisation packets could be implemented as any suitable packet which conveys information about a synchronisation inaccuracy or time delay, and the packets are formatted in accordance with any suitable protocol therefore. For instance, in case of PTP (Precision Time Protocol) a synchronisation packet may comprise a Sync message, a Delay_REQ message, a Delay_RESP message, etc. NTP (Network Time Protocol) is another example of a timing protocol.

Figure 3:
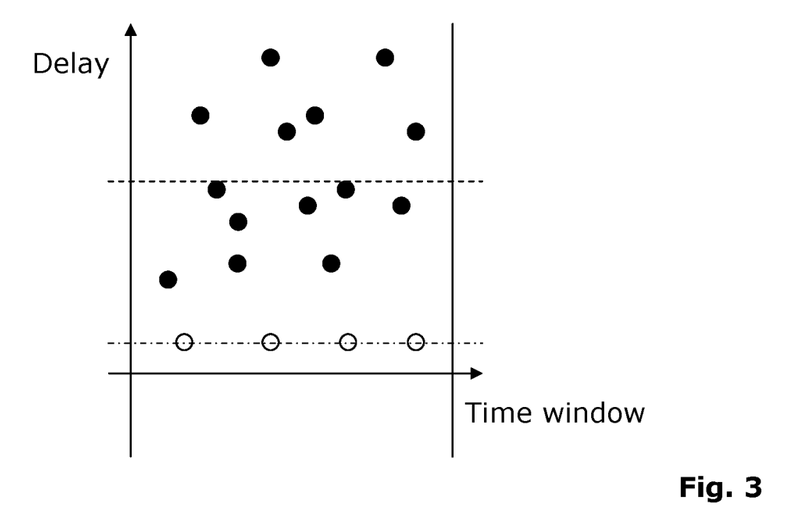
FIG. 3 is schematic diagram of a scenario, according to possible embodiments.

With reference to FIG. 3, which is a schematic graph, some principles of synchronisation will now be described in accordance with one exemplifying embodiment.

In FIG. 3, synchronisation packets which arrive to a boundary clock node are shown. The synchronisation packets are in this embodiment implemented as PTP packets (illustrated as filled dots and unfilled dots).

Today, in PTP based solutions, typically, 64 PTP packets per second could be sent by a synchronisation master node towards the boundary clock node. The PTP packets are delayed in time when they arrive, e.g. due to the propagation times between the intermediate transport network nodes, and internal delays within these intermediate transport network nodes. As mentioned above in an example, corresponding delays occur also for PTP packets propagating from the boundary clock node towards the synchronisation master node. For illustrative purposes and in order to simplify the understanding, the graph shows only the PTP packets which propagate from the synchronisation master node towards the boundary clock node.

As seen in the figure, PTP packets which are only delayed due to the propagation times and fixed latency are shown as unfilled dots, and PTP packets which in addition are affected by variable delays within the intermediate transport network nodes are shown as filled dots. These internal delays are typically caused by buffering or queuing of the PTP packets in the transport network nodes.

When the boundary clock node determines a time offset for the boundary clock node, it monitors the PTP packets which are received during a time window. The mean value of these added delays is illustrated as a dashed line in FIG. 3.

However, the actual time offset between the synchronisation master clock node and the boundary clock node should be calculated on the synchronisation packets that have been delayed due to actual propagation times only. The mean value and variance of these propagation delays are lower, as illustrated in the figure (unfilled dots).

In this embodiment, the intermediate transport network nodes are not supporting IEEE (Institute of Electrical and Electronics Engineers) 1588 but are equipped with functionality to monitor internal levels of delay within the intermediate transport network nodes, i.e. delay caused by the intermediate transport network nodes themselves. When detecting an internal delay they mark passing PTP packets with a delay indication. The boundary clock node will then detect the marked PTP packets and omit them when calculating the offset value, i.e. base the calculation on unmarked PTP packets (unfilled). Thereby, the boundary clock node will calculate an offset value (dash-dotted line in the figure) which is more appropriate to the actual time synchronisation offset within the communication network.

In an alternative embodiment, which is related to the above described one, the boundary clock node sends second PTP packet towards the synchronisation master node. Correspondingly, the transport network nodes also mark these PTP packets when internal delays are detected. The synchronisation master node will then determine the arrival times t4 when these second PTP packets arrives and inform the boundary clock node, e.g. by sending a third PTP packet which comprises the arrival time t4 and a sequence number. These third PTP packets may be sent in direct response to the second PTP packets, or in response to an accumulated amount of second PTP packets.

By also sending these second and third PTP packets, the boundary clock node will be aware of the time delays also in a direction from the boundary clock node to the synchronisation master node. By taking offset values of both these directions into account, the boundary clock node will be able to form a propagation delay free time offset measurement.

In the above described embodiments, PTP synchronisation packets arrive to a boundary clock node or an ordinary clock node, as a non-limiting example. However, the disclosed concept is not limited thereto, and may be applied also for other suitable synchronisation protocols and synchronisation slave nodes. For instance, an ordinary clock node, such as a radio base station of any suitable radio access technology may apply the concept for NTP (Network Time Protocol) or any other suitable synchronisation protocol when appropriate.

In communication networks transport network nodes of various releases, types, generations, vendors, etc. are typically present. Some transport network nodes are not capable of determining their actual internal time delays. In order to properly inform boundary clock nodes or ordinary clock nodes about a current time delay within the communication network nodes, these transport network nodes should have to be replaced with modern ones, or at least need hardware updates to be able to inform the boundary clock nodes of their current internal delays.

However, the above described functionality of detecting a level of delay, e.g. by retrieving internal buffer statuses of queues of the enhanced transport network node, and mark passed synchronisation packets with a delay indication, may be implemented in older types of transport network nodes by means of software updates. Thereby, boundary clock nodes and ordinary clock nodes may get an improved awareness of the actual time synchronisation offset in also for communication networks which comprise a mixture of old and modern transport network nodes.

Figure 4A:
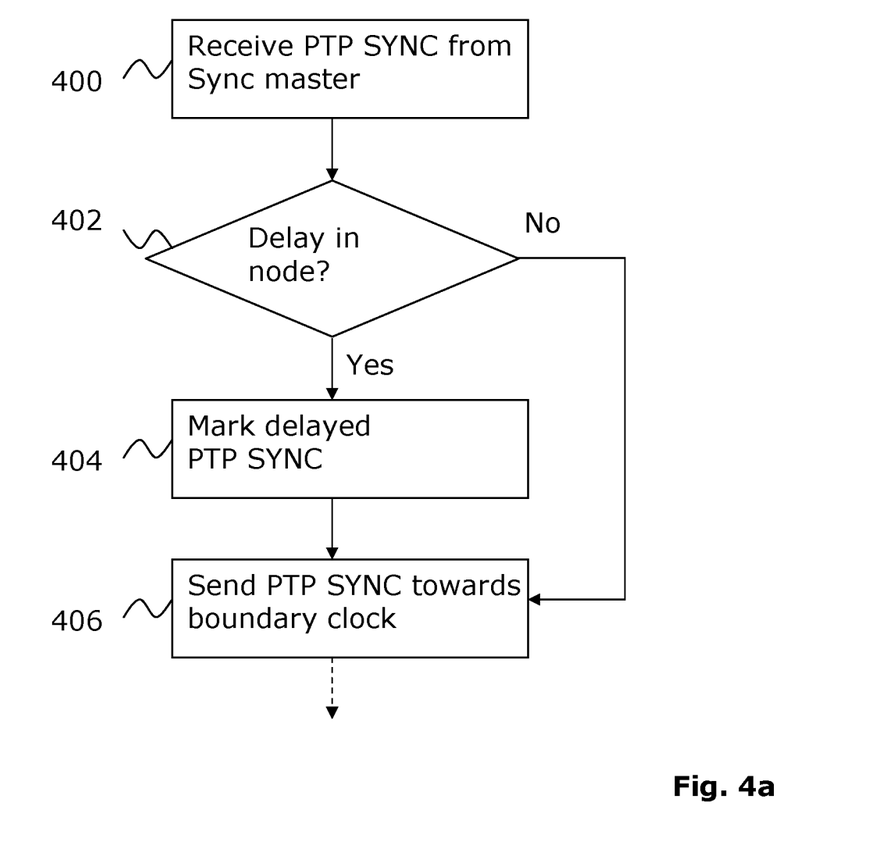
FIGS. 4a-b are schematic flow charts of methods, according to possible embodiments.

With reference to FIG. 4a, which is a schematic flow chart, a method performed by a synchronisation report module of an enhanced transport network node will now be described in accordance with one exemplifying embodiment.

In a communication network, the enhanced transport network node is arranged. This embodiment is based on the PTP protocol and PTP messages, but the disclosed concept is not limited thereto. It is to be noted that the concept may be adapted to be put in practice also for other suitable synchronisation protocol when appropriate, e.g. NTP, etc.

In a first action 400, a first synchronisation packet is received which originates from a synchronisation master node. The synchronisation packet comprises a PTP message, e.g. Sync, and a time t1 when the first synchronisation packet was sent from the synchronisation master node.

In following action 402, a level of delay of the first synchronisation packet is determined, wherein the level of delay relates to an internal delay within the enhanced transport network node. The level of delay may for instance be determined by retrieving one or more buffer statuses of queue-lengths of the enhanced transport network node.

In a subsequent action 404, the first synchronisation packet is marked with a delay indication when the level of delay is above a pre-defined threshold in the enhanced transport network node. The delay indication may be implemented as any suitable flag, marker or value of the synchronisation packet, which will be exemplified below in a related embodiment.

In a final action 406, the synchronisation packet is sent to the boundary clock node, whether or not it is marked with a delay indication.

Thereby, the boundary clock node is enabled to identify delayed packets and can base calculations of time synchronisation offset based on unmarked packets.

As indicated in another embodiment, the enhanced transport network node may be further adapted to indicate internal delay also in a direction from the boundary clock node to the synchronisation master node.

Figure 4B:
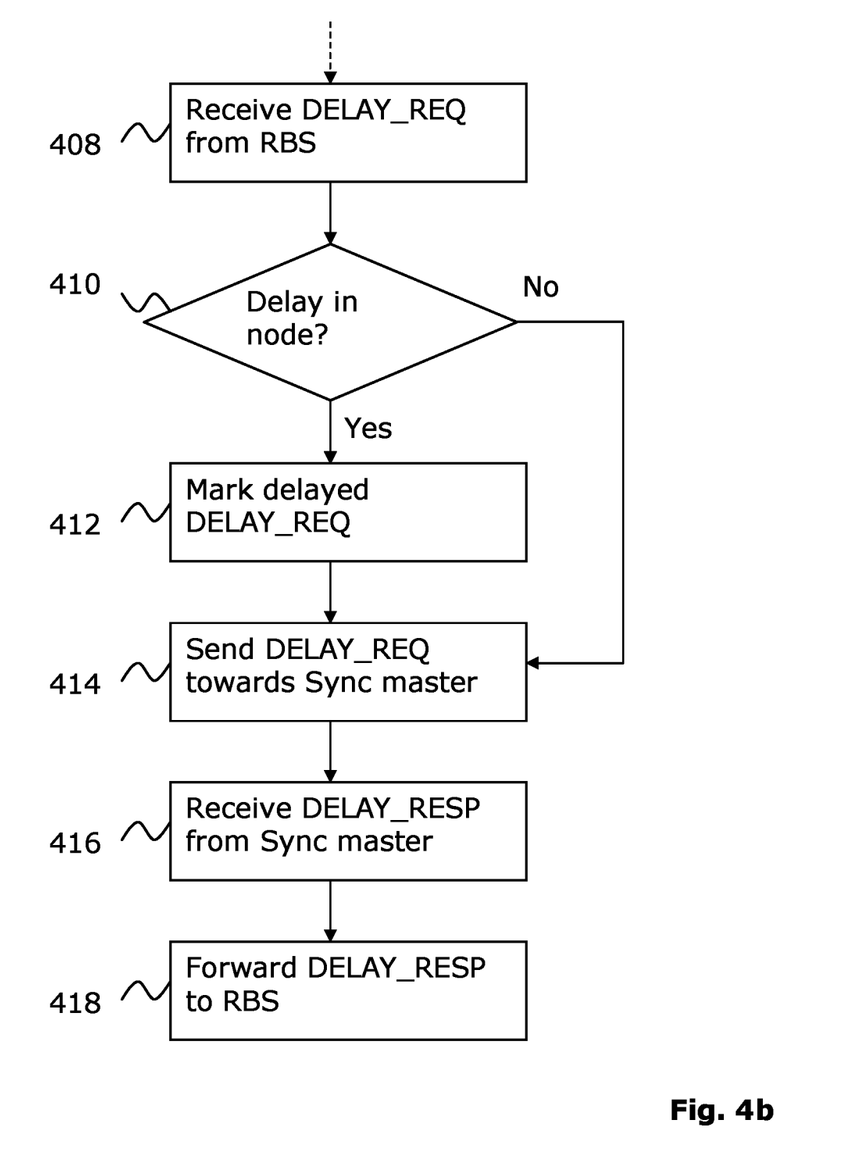

With reference to FIG. 4b, which is a schematic flow chart, an exemplifying embodiment which is based on the above described embodiments of FIG. 4a will now be described.

In an action 408, following the action 406, the enhanced transport network node receives a second synchronisation packet from the boundary clock node. The second synchronisation comprises another PTP messaged, e.g. Delay_Req.

In a following action 410, which corresponds to the above described action 402, the enhanced transport network node determines a level of delay of the second synchronisation packet. Correspondingly, in another action 412, which corresponds to the action 404, the synchronisation packet is marked with a delay indication in the case that the synchronisation packet was determined to be delayed. The thresholds which levels of delay are compared against may be different in actions 410 and 402, without limitation thereto.

In another action 414, the second synchronisation packet is sent to the synchronisation master node.

In a following action 416, a third synchronisation packet, e.g. Delay_Resp, is received from the synchronisation master node. As stated above in another embodiment, the third synchronisation packet may be sent in response to the second synchronisation packet, but may alternatively instead be sent in response to a plurality of received second synchronisation packets. This third synchronisation packet comprises the time(s) t4 and session numbers of the transmittal of the second synchronisation packet(s).

In a final action 418, the third synchronisation packet(s) are forwarded to the boundary clock node.

In a related embodiment, which is based on some above described embodiments, the delay indication is implemented as a timeTraceable flag to 'False' in a PTP header. Alternatively the delay indication may instead be implemented as any of: a suitable profileSpecific flag in the PTP header, a suffix TLV (Time-Length-Value) of the PTP packet, wherein the suffix carrying further information regarding the determined delay, at least one value of a correctionField of the PTP header, etc.

Figure 5:
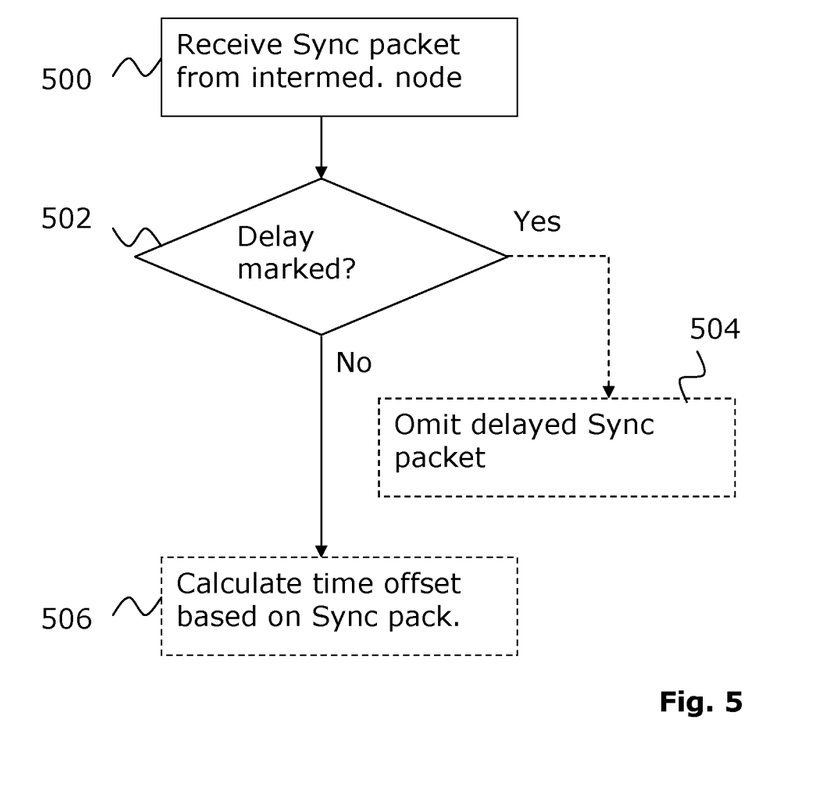
FIG. 5 is a schematic flow chart of a method, according to possible embodiments.

With reference to FIG. 5, which is a schematic flow chart, a method performed by a boundary clock node, will now be described in accordance with one exemplifying embodiment.

In a first action 500, the boundary clock node, which is a transport node of a communication network, receives a synchronisation packet from an intermediate transport network node of a communication network. The synchronisation packet may originate from a synchronisation master node in the communication network.

In a following action 502, the boundary clock node determines a delay indication of the received synchronisation packet. Alternatively, the delay indication may indicate that another related synchronisation packet is delayed. For both cases the delay is caused by intermediate transport network node(s).

By determining whether the received synchronisation packets are marked with a delay indication or not, the boundary clock node may, in an optional action 506, calculate an appropriate time synchronisation offset based on synchronisation packets which are not marked with any delay indications. In another optional action 504, the boundary clock node may omit the marked packets, such that the calculation of action 506 may be performed.

In an alternative embodiment, which is based on some above described ones, a delay indication of the received synchronisation packet does not indicate that the synchronisation packet itself is delayed, but instead that an earlier related sent synchronisation packet was delayed. For instance, as was disclosed in an embodiment in conjunction with FIG. 4b, a third synchronisation packet may indicate that a first or a second synchronisation packet was delayed internally of an intermediate transport network node.

Figure 6:
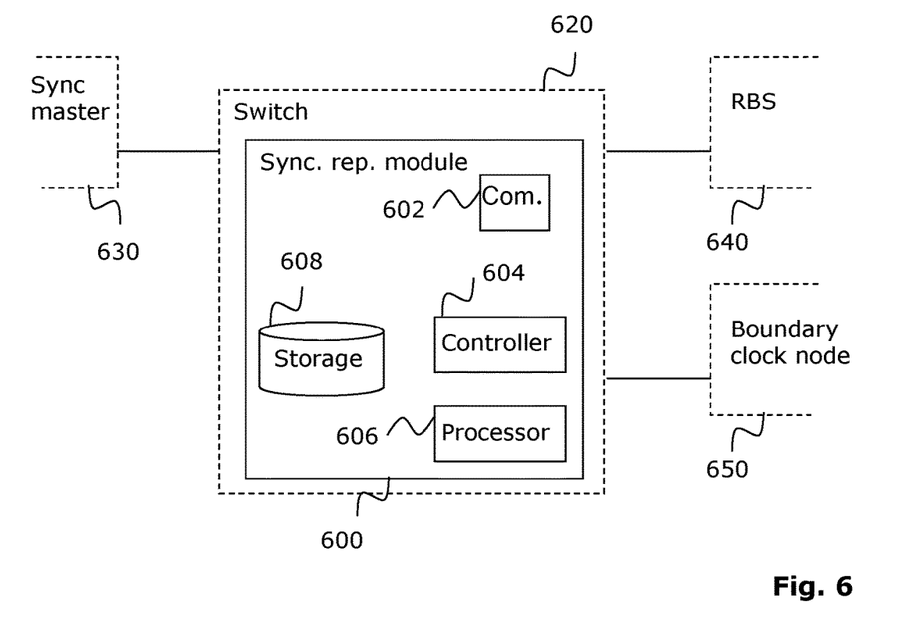
FIG. 6 is a schematic block diagram of an arrangement, according to possible embodiments.

With reference to FIG. 6, which is a schematic block diagram, a synchronisation report module 600 will now be described in accordance with one exemplifying embodiment.

The synchronisation report module 600 is adapted to be arranged in an enhanced transport network node, which in this embodiment is implemented as a switch 620. However, the synchronisation report module 600 may alternatively be arranged in other suitable intermediate transport network nodes communicatively located between a synchronisation master node 630 and a boundary clock node 650, or an ordinary clock node such as a radio base station 640.

The synchronisation report module 600 comprises a communication unit 602 and a controller 604, and optionally a processor 606 and a storage unit 608.

The communication module 602 is adapted to receive a first synchronisation packet which originates from the synchronisation master node 630. The controller 604 is adapted to determine a level of delay of the first synchronisation packet caused by the enhanced transport network node 620, e.g. by retrieving a buffer status or queue-length of the enhanced transport network node 620 and compare with a threshold value. The threshold value may be pre-defined in the enhanced transport network node 620.

Furthermore, the controller 604 is adapted to mark synchronisation packets which are detected as delayed with a delay indication. The communication unit 602 is adapted to send the synchronisation packets to towards ordinary clock nodes 640 or boundary clock nodes 650. Some implementations of delay indications have been discussed above in conjunction with another embodiment, and will therefore not be further discussed herein.

The synchronisation report module 600 may also be adapted to receive further synchronisation packets, determine whether these further synchronisation packets are affected by internal delays caused by the enhanced transport network node 620, and mark them with delay indications before being sent towards the synchronisation master node 630.

Optionally, the synchronisation report module 600 of the above described embodiments may comprise further components or units arranged to provide appropriate functionality. For instance, suitable processors 606 or storage units 608 may by arranged to provide improved calculation capacity, or storing various threshold values of buffer statuses and queue-lengths, etc.

An intermediate enhanced transport network node 620 which comprises the synchronisation report module 600 is also illustrated in FIG. 6.

Figure 7:
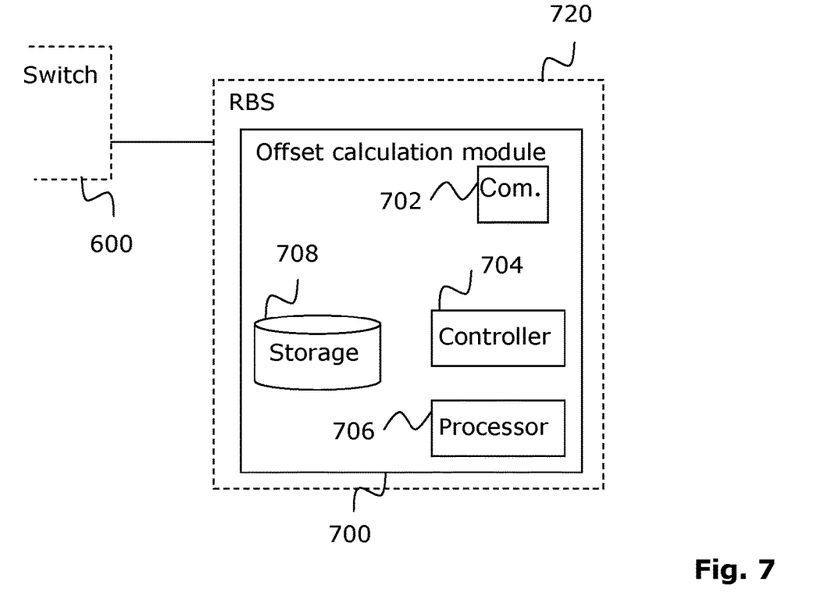
FIG. 7 is a schematic block diagram of an arrangement, according to possible embodiments.

With reference to FIG. 7, which is a schematic block diagram, an offset calculation module 700 will now be described in accordance with one exemplifying embodiment.

The offset calculation module 700 is adapted to be arranged in an ordinary clock node, which in this embodiment is implemented as a radio base station 720. However, the offset calculation module 700 may alternatively be arranged in other suitable boundary clock node or ordinary clock node communicatively connected to an intermediate transport network node 600 (switch in the figure).

The offset calculation module 700 comprises a communication unit 702 and a controller 704, and optionally a processor 706 and a storage unit 708.

The communication module 702 is adapted to receive a first synchronisation packet from the intermediate transport network node 600. The controller 704 is adapted to determine whether a delay indication is comprised in the received synchronisation packet. As stated above in another exemplifying embodiment, the delay indication may relate to the received synchronisation packet itself of to a related synchronisation packet(s).

The controller 704 may be further adapted to calculate a time synchronisation offset between the synchronisation master node and the ordinary clock node 720 based on the synchronisation packets which do not comprise any delay indication(s), i.e. by omitting synchronisation packets which are affected by internal delay of passed intermediate transport network nodes. Some implementation examples of delay indications have been discussed above in conjunction with another embodiment, and will therefore not be further discussed herein.

Optionally, the offset calculation module 700 of the above described embodiments may comprise further components or units arranged to provide appropriate functionality. For instance, suitable processors 706 or storage units 708 may by arranged to provide improved calculation capacity, or storing synchronisation packets or time values to be utilised when calculating the time synchronisation offset.

An ordinary clock node 720 which comprises the offset calculation module 700 is also illustrated in FIG. 7.

It is to be noted that even if the methods, modules and transport network nodes defined above are described as handling one single synchronisation packet at a time in order to simplify the understanding, the disclosed concept is not limited thereto. When put into practice the methods, modules, and nodes are equipped to handle a plurality of synchronisation packets of various types simultaneously. Typically, in PTP based systems, 64 synchronisation packets per second are exchanged in each direction between the synchronisation master node and the boundary clock nodes or ordinary clock nodes.

Figure 8:
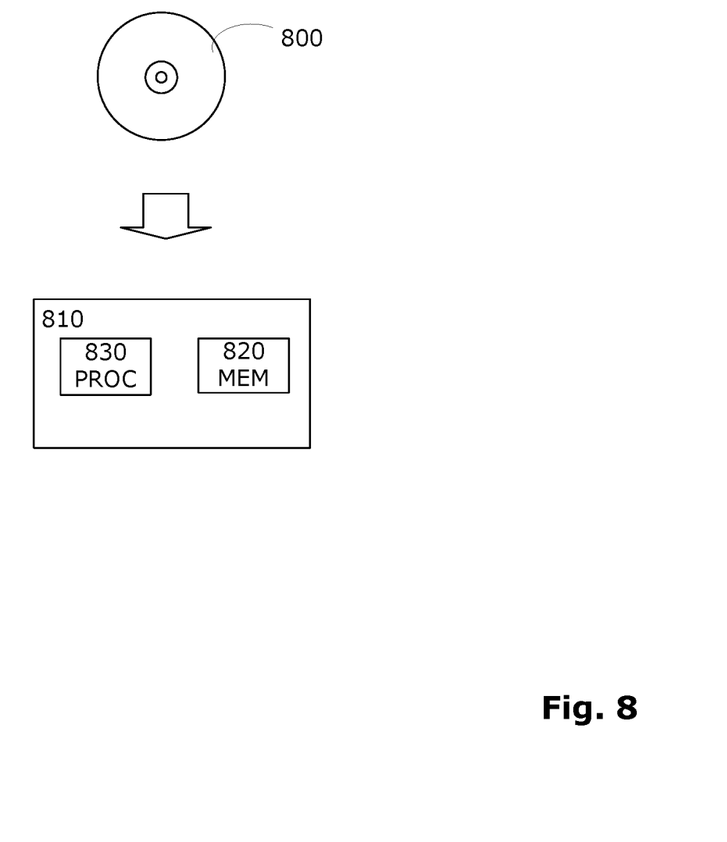
FIG. 8 is a schematic block diagram of a computer program product, according to possible embodiments.

According to some exemplifying embodiments, a computer program product comprises a computer readable medium such as, for example, a diskette or a CD-ROM (Compact Disc Read Only Memory) as illustrated by 800 in FIG. 8. The computer readable medium may have stored thereon a computer program comprising program instructions. The computer program may be loadable into a data-processing unit 830, which may, for example, be comprised in a communication network node 810. When loaded into the data-processing unit 830, the computer program may be stored in a memory 820 associated with or integral to the data-processing unit 830. According to some embodiments, the computer program may, when loaded into and run by the data-processing unit 830, cause the data-processing unit 830 to execute method steps according to, for example, the methods shown in the FIGS. 4a, 4b, and 5.

It is to be noted that the arrangements of the described exemplifying embodiments are described in a non-limiting manner. Typically, a designer may select to arrange further units and components to provide appropriate operation of the communication network node, within the described concept, e.g. further processors or memories. Moreover, physical implementations of the proposed arrangements may be performed alternatively within the disclosed concept. For instance, functionality of a specific illustrated unit, module, or node may be implemented in another suitable unit, module, or node when put into practice. The disclosed synchronisation report module and offset calculation module are also not limited to be implemented as specific physical nodes. A designer may select to implement corresponding synchronisation report functions, and synchronisation functions as virtual nodes in any suitable nodes which are connected to the communication network, within the disclosed concept.

The functions of the various elements including functional blocks may be provided through the use of hardware such as circuit hardware and/or hardware capable of executing software in the form of coded instructions stored on the above-mentioned computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analogue) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Reference throughout the specification to "one embodiment" or "an embodiment" is used to mean that a particular feature, structure or characteristic described in connection with an embodiment is included in at least one embodiment. Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, the invention is limited only by the accompanying claims and other embodiments than the specific above are equally possible within the scope of the appended claims. Moreover, it should be appreciated that the terms "comprise/comprises" or "include/includes", as used herein, do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The scope is generally defined by the following independent claims. Exemplifying embodiments are defined by the dependent claims.

The invention claimed is:

1. A method performed by a synchronisation report module of a first transport network node for providing delay information to synchronisation packets passing the first transport network node, the method comprising:
receiving a first synchronisation packet originating from a second transport network node, wherein the first synchronisation packet is a Precision Time Protocol (PTP) packet,
determining a level of delay, that relates to an internal delay within the first transport network node, to be encountered by the first synchronisation packet in passing through the first transport network node,
when the level of delay is above a first threshold, marking the first synchronisation packet with a delay indication by at least one of:
setting a timeTraceable flag to False in a PTP header,
setting at least one profileSpecific flag in the PTP header,
adding a suffix Time-Length-Value (TLV) to the PTP packet, the suffix carrying further information regarding respective level of delay, and
setting at least one value of a correctionField of a PTP header, and
sending the first synchronisation packet towards a third transport network node with the delay indication.

2. The method according to claim 1, further comprising:
receiving a second synchronisation packet originating from the third transport network node, wherein the second synchronisation packet is also a Precision Time Protocol (PTP) packet,
determining another level of delay, that relates to an internal delay within the first transport network node, to be encountered by the second synchronisation packet in passing through the first transport network node,
when the another level of delay is above a second threshold, marking the second synchronisation packet with a second delay indication by at least one of:
setting a timeTraceable flag to False in a PTP header,
setting at least one profileSpecific flag in the PTP header,
adding a suffix Time-Length-Value (TLV) to the PTP packet, the suffix carrying further information regarding respective level of delay, and
setting at least one value of a correctionField of a PTP header, and
sending the second synchronisation packet towards the second transport network node with the second delay indication.

3. The method according to claim 2, further comprising:
receiving a third synchronisation packet originating from the second transport network nodpe, wherein the third synchronisation packet carries the second delay indication of the second synchronisation packet, and
forwarding the third synchronisation packet towards the third transport network node.

4. The method according to claim 2, wherein the method further comprising at least one of:
determining the level of delay and determining the another level of delay by:
retrieving a buffer status, or
a queue-length of the transport network node.

5. A synchronisation report module device configured in a first transport network node for provisioning of delay information to synchronisation packets, the synchronisation report module device comprising:
one or more processors;
a storage medium;
a communication unit, and
a controller,
wherein the communication unit is configured to receive a first synchronisation packet originating from a second transport network node, wherein the first synchronisation packet is a Precision Time Protocol (PTP) packet,
wherein the controller is configured to determine a level of delay, that relates to an internal delay within the first transport network node, to be encountered by the first synchronisation packet in passing through the first transport network node, and when the level of delay is above a first threshold, mark the synchronisation packet with a delay indication by at least one of:
setting a timeTraceable flag to False in a PTP header,
setting at least one profileSpecific flag in the PTP header,
adding a suffix Time-Length-Value (TLV) to the PTP packet, the suffix carrying further information regarding respective level of delay, and
setting at least one value of a correctionField of a PTP header, and
wherein the communication unit is further configured to send the first synchronisation packet towards a third transport network node with the delay indication.

6. The synchronisation report module device according to claim 5,
wherein the communication unit is configured to receive a second synchronisation packet originating from the third transport network node, wherein the second synchronisation packet is also a Precision Time Protocol (PTP) packet,
wherein the controller is configured to determine another level of delay, that relates to an internal delay within the first transport network node, to be encountered by the second synchronisation packet in passing through the first transport network node, and when the another level of delay is above a second threshold, mark the second synchronisation packet with a second delay indication by at least one of:
setting a timeTraceable flag to False in a PTP header,
setting at least one profileSpecific flag in the PTP header,
adding a suffix Time-Length-Value (TLV) to the PTP packet, the suffix carrying further information regarding respective level of delay, and
setting at least one value of a correctionField of a PTP header, and
wherein the communication unit is further configured to send the second synchronisation packet towards the third transport network node with the second delay indication.

7. The synchronisation report module device according to claim 6, wherein the communication unit is configured to:
receive a third synchronisation packet originating from the second transport network node, wherein the third synchronisation packet carries the second delay indication of the second synchronisation packet, and
forward the third synchronisation packet towards the third transport network node.

8. The synchronisation report module device according to claim 6, wherein the controller is configured to at least one of:
determine the level of delay and determine the another level of delay by:
retrieving a buffer status, or
a queue-length of the transport network node.

9. A method performed by an offset calculation module of a first transport network node for enabling the first transport network node to calculate a time synchronisation offset value between a second transport network node and the first transport network node, the method comprising:
receiving a synchronisation packet from an intermediate transport network node situated between the second transport network node and the first transport network node, wherein the synchronisation packet is a Precision Time Protocol (PTP) packet,
determining a presence of a delay indication with the received synchronisation packet, wherein the delay indication is associated with the received synchronisation packet or a related synchronisation packet passing through the intermediate transport network node, wherein the delay indication indicates that an internal delay within the intermediate transport network node exceeded a first threshold, and wherein the delay indication is detected by at least one of:
a timeTraceable flag to False in a PTP header,
at least one profileSpecific flag in the PTP header,
a Time-Length-Value (TLV) suffix added to the PTP packet, the suffix carrying further information regarding respective level of delay, and at least one value of a correctionField of a PTP header, and enabling calculation of the time synchronisation offset value based on at least one of the received synchronisation packet or the related synchronisation packet, when the delay indication is not present.

10. An offset calculation module device configured in first transport network node for enabling the first transport network node to calculate a time synchronisation offset value between a second transport network node and the first transport network node, the offset calculation module comprising:

one or more processors;
a memory;
a communication unit, and
a controller,
wherein the communication unit is configured to receive a synchronisation packet from an intermediate transport network node situated between the second transport network node and the first transport network node, wherein the synchronisation packet is a Precision Time Protocol (PTP) packet,
wherein the controller is configured to determine a presence of a delay indication with the received synchronisation packet, wherein the delay indication is associated with the received synchronisation packet or a related synchronisation packet passing through the intermediate transport network node, wherein the delay indication indicates that an internal delay within the intermediate transport network node exceeded a first threshold, and wherein the delay indication is detected by at least one of:
a timeTraceable flag to False in a PTP header,
at least one profileSpecific flag in the PTP header,
a Time-Length-Value (TLV) suffix added to the PTP packet, the suffix carrying further information regarding respective level of delay, and
at least one value of a correctionField of a PTP header, and
wherein the first transport network node is enabled to calculate the time synchronisation offset value based on at least one of the received synchronisation packet or the related synchronisation packet, when the delay indication is not present.

11. A non-transitory computer readable medium having thereon a computer program comprising program instructions, the computer program being loadable into a data-processing unit of a synchronisation report module of a first transport network node and configured to perform operations when the computer program is run by the data-processing unit, the operations comprising:

receiving a synchronisation packet originating from a second transport network node, wherein the synchronisation packet is a Precision Time Protocol (PTP) packet, determining a level of delay, that relates to an internal delay within the first transport network node, to be encountered by the synchronisation packet in passing through the first transport network node,
when the level of delay is above a first threshold, marking the synchronisation packet with a delay indication by at least one of:
setting a timeTraceable flag to False in a PTP header,
setting at least one profileSpecific flag in the PTP header,
adding a suffix Time-Length-Value (TLV) to the PTP packet, the suffix carrying further information regarding respective level of delay, and
setting at least one value of a correctionField of a PTP header, and
sending the synchronisation packet towards a third transport network node with the delay indication.

12. A non-transitory computer readable medium having thereon a computer program comprising program instructions, the computer program being loadable into a data-processing unit of an offset calculation module of a first transport network node and configured to perform operations when the computer program is run by the data-processing unit, the operations comprising:

receiving a synchronisation packet from an intermediate transport network node situated between a second transport network node and the first transport network node, wherein the synchronisation packet is a Precision Time Protocol (PTP) packet,
determining a presence of a delay indication with the received synchronisation packet, wherein the delay indication is associated with the received synchronisation packet or a related synchronisation packet passing through the intermediate transport network node and wherein the delay indication indicates that an internal delay within the intermediate transport network node exceeded a first threshold, and wherein the delay indication is detected by at least one of:
a timeTraceable flag to False in a PTP header,
at least one profileSpecific flag in the PTP header,
a Time-Length-Value (TLV) suffix added to the PTP packet, the suffix carrying further information regarding respective level of delay, and
at least one value of a correctionField of a PTP header, and
enabling calculation of a time synchronisation offset value between the second transport network node and the first transport network node, based on at least one of the received synchronisation packet or the related synchronisation packet, when the delay indication is not present.

* * * * *